(12) United States Patent
Ohtsuka et al.

(10) Patent No.: US 6,420,467 B1
(45) Date of Patent: Jul. 16, 2002

(54) CURABLE RESIN COMPOSITION, ADHESIVE COMPOSITION, CURED PRODUCT AND COMPOSITE

(75) Inventors: Nobuyuki Ohtsuka; Kinpei Iwata; Hideyuki Takahashi; Koichi Taguchi, all of Shibukawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 82 days.

(21) Appl. No.: 09/103,542

(22) Filed: Jun. 24, 1998

(30) Foreign Application Priority Data

Jun. 24, 1997 (JP) ............................................. 9-166805

(51) Int. Cl.$^7$ ........................ C08F 293/00; B32B 15/08; B32B 27/30
(52) U.S. Cl. ........................ 524/314; 428/463; 428/522
(58) Field of Search .................... 525/263, 264, 525/265, 304; 524/314; 428/463, 522

(56) References Cited

U.S. PATENT DOCUMENTS

| | | | |
|---|---|---|---|
| 3,832,274 A | | 8/1974 | Owston ..................... 161/183 |
| 4,096,201 A | * | 6/1978 | Kishi et al. ................ 260/879 |
| 4,124,752 A | | 11/1978 | Oosterwijk ................ 521/94 |
| 4,223,115 A | | 9/1980 | Zalucha et al. ............ 525/455 |
| 4,293,665 A | | 10/1981 | Zalucha et al. ............ 525/255 |
| 4,446,246 A | | 5/1984 | McGinniss ................ 502/155 |
| 5,328,947 A | * | 7/1994 | Taguchi et al. ............ 524/850 |
| 5,330,844 A | * | 7/1994 | Taguchi et al. ............ 428/463 |
| 5,399,621 A | | 3/1995 | Kohlhammer .............. 525/263 |
| 5,874,143 A | * | 2/1999 | Peloquin et al. ............ 428/40.1 |
| RE36,140 E | * | 3/1999 | Taguchi et al. ............ 524/850 |
| 5,955,512 A | * | 9/1999 | Numazawa et al. ......... 522/95 |

FOREIGN PATENT DOCUMENTS

EP 0 075 486 3/1983

OTHER PUBLICATIONS

Derwent Publications, 82–98475, JP 57–164106, Oct. 8, 1982.
Derwent Publications, 82–16589, JP 57–012039, Jan. 21, 1982.
Database WPI, Derwent Publications, AN 77–76415Y, JP 50–124939, Oct. 1, 1975.
Database WPI, Derwent Publications, AN 77–76416Y, JP 50–124940, Oct. 1, 1975.

* cited by examiner

Primary Examiner—Blaine Copenheaver
Assistant Examiner—Kevin R. Kruer
(74) Attorney, Agent, or Firm—Oblon, Spivak, McClelland, Maier & Neustadt, P.C.

(57) ABSTRACT

A curable resin composition comprising:

(1) a compound having a structure of the formula (A) and/or (B):

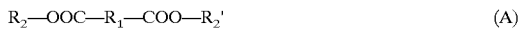

wherein $R_1$ is —$(CH_2)_n$— (wherein n is from 4 to 6), or an o-, m- or p-phenylene group, and each of $R_2$ and $R_2'$ is a $C_{1-10}$ alkyl group,

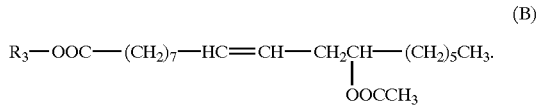

wherein $R_3$ is a $C_{1-4}$ alkyl group,
(2) a polymerizable vinyl monomer,
(3) an organic peroxide,
(4) a reducing agent, and
(5) an elastomer component.

16 Claims, 2 Drawing Sheets

CURABLE RESIN COMPOSITION, ADHESIVE COMPOSITION, CURED PRODUCT AND COMPOSITE

FIELD OF THE INVENTION

The present invention relates to a curable resin composition, particularly an adhesive composition, having a quick curing property. More particularly, it relates to an adhesive composition suitable for assembling a field system of a speaker.

BACKGROUND OF THE INVENTION

There has been an increasing use, year after year, of a cold quick-curing adhesive which is curable at a normal or room temperature in a short period of time, with a view to labor-saving, resource-saving and energy-saving.

Especially in assembling a speaker, various materials such as metal, magnetic material, paper and cloth are bonded, and it is required to carry out assembling the speaker made of such various materials in a short period of time. Accordingly, an adhesive composition is desired which is capable of bonding such materials in a short period of time.

Usually, a speaker has a construction as shown in FIG. 1. Namely, a frame 4 is bonded to a field system comprising a bottom plate 1, a ring-shaped magnet 2 and a ring-shaped top plate 3 which are laminated and bonded. To the peripheral portion of this frame 4, the peripheral portion (the cone edge) 7 of a cone 6 is bonded. To the center portion of this cone 6, a voice coil 8 is bonded. The intermediate portion of this voice coil 8 is held by a damper 9, and the lower portion of the voice coil 8 is fitted on the center portion of the bottom plate 1. A dust cap 10 is bonded to the center upper surface of the cone 6. As shown in FIG. 2, the voice coil 8 has a paper tape 11 wound on its outer circumference, and a coil 12 is wound on the outer circumference of the paper tape 11.

Particularly, bonding of the field system of a speaker comprising a bottom plate 1, a magnet 2 and a top plate 3 is as shown in FIG. 2. Namely, the field system of a speaker is assembled by bonding and laminating the bottom plate 1, the magnet 2 and the top plate 3 sequentially by an adhesive composition 13.

Heretofore, as a cold quick-curing adhesive, a two-pack type quick-curable epoxy adhesive, an anaerobic adhesive, an instantaneous adhesive or a second generation acrylic adhesive (SGA) has been known.

The two-pack type quick-curing epoxy adhesive is designed so that a main agent and a curing agent are weighed, mixed and coated on an adherent, whereupon the adhesive cures by the reaction of the main agent and the curing agent. However, such a two-pack type quick-curing epoxy adhesive has had a drawback that if weighing or mixing of the main agent and the curing agent is inadequate, the bond strength is likely to be remarkably low, and even if weighing and mixing are adequately carried out, the peel strength and impact strength tend to be low.

The anaerobic adhesive is designed so that the adhesive composition is pressed between adherends to cut off air for curing. However, it has had a drawback that if a part of the adhesive composition is squeezed out at the time of pressing, such a squeeze-out portion will be in contact with air and will not be cured. Further, it has another drawback that it is not curable when a clearance between adherends is large.

The instantaneous adhesive usually comprises cyanoacrylate as the main component and is excellent in the operation efficiency. However, it has had a drawback that the peel strength or impact strength is low. Further, the moisture resistance or water resistance is poor, whereby the range of its application is limited.

SGA is a two-pack type. Nevertheless, it requires no accurate weighing of the two liquids, and it cures at room temperature in a few or a few tens minutes even when weighing or mixing is inadequate, in some cases, simply by contacting the two liquids without requiring accurate weighing of the two liquids. Accordingly, it is excellent in the operation efficiency and yet SGA provides high peel strength or impact strength, and curing of the squeeze-out portion is also good. For this reason, it is widely employed (JP-B-58-34513, JP-B-58-5954 and JP-A-54-141826).

However, SGA usually takes a long time for curing, and it is difficult to accelerate the curing. In order to accelerate the curing of SGA, an attempt has been made to increase the amount of an organic peroxide, a reducing agent or a (meth)acrylic acid (JP-B-53-24103). However, if the amount of an organic peroxide is increased in order to accelerate the curing, there has been a problem that the storage stability tends to be poor. If the amount of the reducing agent is increased, there has been a problem that an unreacted reducing agent remains in the cured product, whereby the bond strength tends to be low. If the amount of the (meth)acrylic acid is increased, the curing can be accelerated, but unreacted (meth)acrylic acid tends to remain in the cured product, thus leading to a problem of causing rust to a metal, or corroding and breaking e.g. a copper wire.

In recent years, as a speaker, there has been an increasing demand for a speaker to be mounted on a vehicle, to be used for automobiles. The temperature in an automobile changes vigorously, for example, from a low temperature of −40° C. to a high temperature of 85° C., depending upon the weather of the particular region, the seasonal change from winter to summer, and the operation or termination of the engine. Accordingly, high thermal shock resistance has been required for a speaker to be mounted on a vehicle, particularly for a field system of a speaker to be mounted on a vehicle. Here, the thermal shock resistance is a bond strength against a vigorous temperature change i.e. in an environment of rapid heating or rapid cooling. If the thermal shock resistance is poor, there will be a problem that the bottom plate 1, the magnet 2 and the top plate 3 tend to peel, or the magnet 2 tends to break, whereby the speaker will not function properly.

SUMMARY OF THE INVENTION

The present inventors have conducted an extensive study and as a result, have found that the above problems can be solved by using compounds having specific structures. The present invention has been accomplished on the basis of this discovery.

Namely, the present invention provides:

A curable resin composition comprising:

(1) a compound having a structure of the formula (A) and/or (B):

$$R_2\text{—OOC—}R_1\text{—COO—}R_2' \qquad (A)$$

wherein $R_1$ is —$(CH_2)_n$— (wherein n is from 4 to 6), or an o-, m- or p-phenylene group, and each of $R_2$ and $R_2'$ is a $C_{1-10}$ alkyl group,

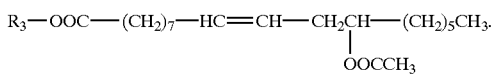

(B)

wherein $R_3$ is a $C_{1-4}$ alkyl group, (2) a polymerizable vinyl monomer,
(3) an organic peroxide,
(4) a reducing agent, and
(5) an elastomer component.

The curable resin composition which contains (6) an acid phosphate compound of the formula (C):

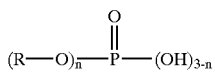

(C)

wherein R is $CH_2=CR_4CO(OR_5)_m$— (wherein $R_4$ is hydrogen or a methyl group, $R_5$ is —$C_2H_4$—, —$C_3H_6$—, —$CH_2CH(CH_3)$—, —$C_4H_8$—, —$C_6H_{12}$— or

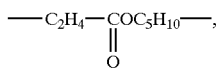

and m is an integer of from 1 to 10), and n is an integer of 1 or 2.

The curable resin composition wherein (1) the compound having a structure of the formula (A) is di-2-ethylhexyl adipate and/or di-n-octyl phthalate.

The curable resin composition wherein (1) the compound having a structure of the formula (B) is methylacetyl ricinolate and/or butylacetyl ricinolate.

The curable resin composition wherein (2) the polymerizable vinyl monomer is an acrylate and/or a methacrylate.

The curable resin composition wherein (2) the polymerizable vinyl monomer is at least one member selected from the group consisting of 2-ethylhexyl acrylate, 2-ethylhexyl methacrylate, 2-hydroxyethyl acrylate, 2-hydroxyethyl methacrylate, methyl acrylate and methyl methacrylate.

The curable resin composition wherein (5) the elastomer component is at least one member selected from the group consisting of an acrylonitrile-butadiene-methacrylic acid copolymer, an acrylonitrile-butadiene-methyl methacrylate copolymer, a butadiene-styrene-methyl methacrylate copolymer and an acrylonitrile-butadiene rubber.

The curable resin composition wherein (5) the elastomer component is an acrylonitrile-butadiene-methacrylic acid copolymer.

The curable resin composition which is a two-pack type curable resin composition comprising a first pack and a second pack, wherein the first pack contains at least the organic peroxide, and the second pack contains at least the reducing agent.

An adhesive composition containing the curable resin composition.

A cured product of the adhesive composition.

A composite comprising adherends bonded by the cured product.

The composite wherein the adherends are made of ceramics and/or metal.

The composite wherein the adherends are made of ceramics and metal.

The composite wherein the ceramics is a magnet.

The composite wherein the adherends are a frame and a cone of a speaker, which are bonded to each other along their peripheral portions, and/or a bottom plate, a magnet and a top plate of a speaker, which are laminated and bonded to form a field system of the speaker.

The composite wherein the adherends are a bottom plate, a magnet and a top plate of a speaker, which are laminated and bonded to form a field system of the speaker.

DETAILED DESCRIPTION ON THE INVENTION

Figure 1:
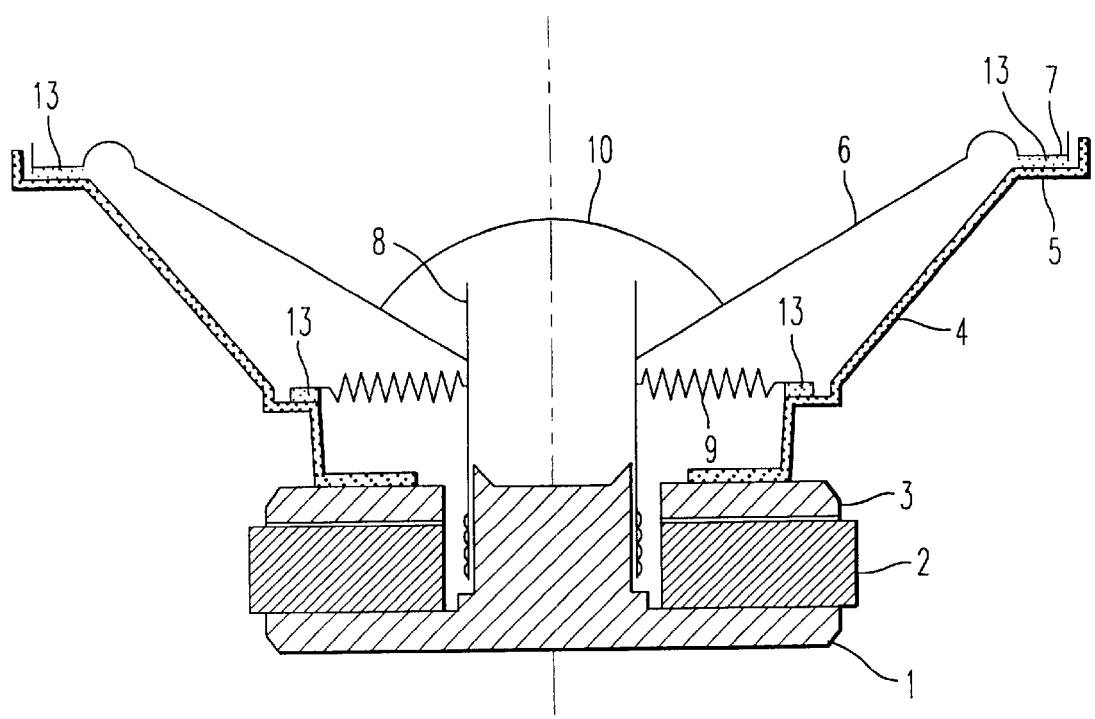
FIG. 1 is a cross-sectional view of a speaker.

Now, the present invention will be described in detail with reference to the preferred embodiments.

(1) The compound having a structure of the formula (A) and/or (B) to be used in the present invention is a compound having the following structure:

(A)

wherein $R_1$ is —$(CH_2)_n$— (wherein n is from 4 to 6), or an o-, m- or p-phenylene group, and each of $R_2$ and $R_2'$ is a $C_{1-10}$ alkyl group,

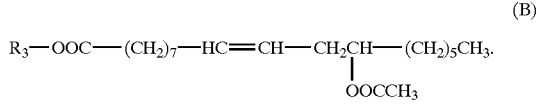

(B)

wherein $R_3$ is a $C_1$ alkyl group.

By the use of component (1), curing can be accelerated, whereby there will be effects such that the thermal shock resistance evaluated by the bond strength and adhesion after the heat shock test, is high, the magnet in the field system of the speaker scarcely undergoes breakage, and the top plate or the bottom plate tends to scarcely peel from the magnet. Such effects for accelerating the curing are advantageous for the production of the field system of a speaker from the following viewpoint.

In the production of the field system for a speaker, it is necessary to maintain the precision in assembling to be precise and constant so as not to dislocate the positions of the magnet and plates such as the top plate and the bottom plate. For this purpose, it used to be necessary to secure the speaker field system by means of a large amount of jigs until the adhesive composition cures. In the production of the speaker field system by automation, if the curing time is short, use of the jigs can substantially be reduced, and a large quantity of products can be produced, such being extremely advantageous for industrial applicability.

The compound having a structure of the formula (A) is not particularly limited. However, at least one member selected from the group consisting of di-2-ethylhexyl adipate, di-2-ethylhexyl phthalate, diheptyl phthalate, diisodecyl phthalate, diisononyl phthalate, di-n-octyl phthalate, di-n-decyl phthalate and di-linevol 79 phthalate (manufactured by Mitsubishi Gas Chemical Co., Ltd.), may be mentioned as preferred. Among them, di-2-ethylhexyl adipate and/or di-n-octyl phthalate, is preferred from the viewpoint of the acceleration of curing. Particularly preferred is di-2-ethylhexyl adipate.

As the compound having a structure of the formula (B), methylacetyl ricinolate or butylacetyl ricinolate may, for example, be mentioned. Among them, methylacetyl ricinolate and/or butylacetyl ricinolate are preferred from the viewpoint of the acceleration of curing, and particularly preferred is methylacetyl ricinolate.

One or more of such compounds may be used. Among them, a compound of the formula (A) is preferred in view of the high effect.

The component (1) is used preferably in an amount of from 1 to 40 parts by weight, more preferably from 3 to 35 parts by weight, per 100 parts by weight of the total amount of the components (2) and (5). If it is less than 1 part by weight, the curing-accelerating effect or the heat shock resistance tends to be poor, and the magnet is likely to peel or break. On the other hand, if it exceeds 40 parts by weight, the curing-accelerating effect or the thermal shock resistance tends to be poor, and the magnet is likely to peel.

(2) The polymerizable vinyl monomer to be used in the present invention, may, for example, be an acrylate or a methacrylate, such as methyl acrylate, methyl methacrylate, ethyl acrylate, ethyl methacrylate, butyl acrylate, butyl methacrylate, 2-ethylhexyl acrylate, 2-ethylhexyl methacrylate, cyclohexyl acrylate, cyclohexyl methacrylate, 2-hydroxyethyl acrylate, 2-hydroxyethyl methacrylate, 2-hydroxypropyl acrylate, 2-hydroxypropyl methacrylate, glycidyl acrylate, glycidyl methacrylate, diethylene glycol diacrylate, diethylene glycol dimethacrylate, dipropylene glycol acrylate, dipropylene glycol methacrylate, trimethylol propane triacrylate, trimethylol propane trimethacrylate, pentaerythritol tetraacrylate, pentaerythritol tetramethacrylate, dipentaerythritol hexaacrylate, dipentaerythritol hexamethacrylate, tris(acryloyloxy)ethyl isocyanurate, tris(methacryloyloxyl)ethyl isocyanurate, 2,2-bis(4-acryloxyphenyl)propane, 2,2-bis(4-methacryloxyphenyl)propane, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, 2,2-bis(4-acryloxypropoxyphenyl)propane, 2,2-bis(4-methacryloxypropoxyphenyl)propane, 2,2-bis(4-acryloxytetraethoxyphenyl)propane, 2,2-bis(4-methacryloxytetraethoxyphenyl)propane, dicyclopentenyl acrylate, dicyclopentenyl methacrylate, dicyclopentenyloxyethyl acrylate, dicyclopentenyloxyethyl methacrylate, epoxy acrylate "Epoxy ester 3000M" (manufactured by Kyoeisha Kagaku K.K.), epoxy acrylate "Epoxy ester 3000A" (manufactured by Kyoeisha Kagaku K.K.). epoxy acrylate "NK oligo EA1020" (manufactured by Shin Nakamura Kagaku K.K.), epoxy acrylate "NK oligo EMA1020" (manufactured by Shin Nakamura Kagaku K.K.), epoxy acrylate "LK ester BPE500" (manufactured by Shin Nakamura Kagaku K.K.), epoxy acrylate "Biscoat #540" (manufactured by Osaka Yuki Kagaku K.K.), polyester acrylate "Aronix M-6100" (manufactured by Toa Gosei K.K.), urethane acrylate "Aronix M-1100" (manufactured by Toa Gosei K.K.), polybutadiene acrylate "TE-2000" (manufactured by Nippon Soda K.K.) or acrylonitrilebutadiene acrylate "Hycar VTBNX" (manufactured by Ube Kosan K.K.), vinyl acetate, styrene, vinyl toluene, or divinyl toluene. One or more of these compounds may be used. Here, the epoxy acrylate means an epoxy resin having acryloyl groups and/or methacryloyl groups at its both terminals.

Among them, an acrylate and/or a methacrylate is preferred from the viewpoint of the adhesiveness. More preferred is at least one member selected from the group consisting of 2-ethylhexyl acrylate, 2-ethylhexyl methacrylate, 2-hydroxyethyl acrylate, 2-hydroxyethyl methacrylate, methyl acrylate and methyl methacrylate. Most preferred is 2-ethylhexyl methacrylate, 2-hydroxyethyl methacrylate and/or methyl methacrylate.

The component (2) is used preferably in an amount of from 60 to 95 parts by weight, more preferably from 65 to 90 parts by weight, per 100 parts by weight of the total amount of the components (2) and (5). If it is less than 60 parts by weight, the viscosity tends to be too high that there will be inconvenience from the viewpoint of the operation, and the thermal shock resistance or the adhesion at room temperature tends to be poor. On the other hand, if it exceeds 95 parts by weight, the viscosity, the adhesiveness under the thermal shock resistance and the adhesion at room temperature tend to be poor.

(3) The organic peroxide to be used in the present invention, may, for example, be cumene hydroperoxide, paracumene hydroperoxide, tert-butyl hydroperoxide, diisopropylbenzene dihydroperoxide, methyl ethyl ketone peroxide, benzoyl peroxide or tert-butyl peroxybenzoate. One or more of them may be used. Among them, cumene hydroperoxide is preferred from the viewpoint of the reactivity.

The component (3) is used preferably in an amount of from 0.5 to 10 parts by weight, more preferably from 1 to 8 parts by weight, per 100 parts by weight of the total mount of the components (2) and (5). If it is less than 0.5 part by weight, the curing speed tends to be slow, and if it exceeds 10 parts by weight, the storage stability tends to be poor.

(4) The reducing agent to be used in the present invention may be any reducing agent which reacts with the above organic peroxide to generate radicals. As such a reducing agent, a tertiary amine, a thiourea derivative or a metal salt may, for example, be mentioned.

The tertiary amine may, for example, be triethylamine, tripropylamine, tributylamine or N,N-dimethylparatoluidine. The thiourea derivative may, for example, be 2-mercaptobenzimidazole, methylthiourea, dibutylthiourea, tetramethylthiourea or ethylenethiourea. The metal salt may, for example, be cobalt naphthenate, copper naphthenate or vanadylacetyl acetonate. One or more of them may be used. Among them, a thiourea derivative is preferred from the viewpoint of the acceleration of curing, and particularly preferred is ethylenethiourea.

The component (4) is used preferably in an amount of from 0.1 to 10 parts by weight, more preferably from 0.5 to 5 parts by weight, per 100 parts by weight of the total amount of the components (2) and (5). If it is less than 0.1 part by weight, the curing speed tends to be slow, and if it exceeds 10 parts by weight, an unreacted reducing agent tends to remain, whereby the adhesion tends to be poor.

In the present invention, (5) the elastomer component is used in order to improve the adhesion. The elastomer component means a polymer substance having a rubbery elasticity at room temperature. Preferred is one which can be dissolved or dispersed in a polymerizable vinyl monomer.

Such an elastomer component may, for example, be an acrylonitrile-butadiene-methacrylic acid copolymer, an acrylonitrile-butadiene-methyl methacrylate copolymer, a butadiene-styrene-methyl methacrylate copolymer (MBS), an acrylonitrile-styrene-butadiene copolymer, or a synthetic rubber such as an acrylonitrile-butadiene rubber, a linear polyurethane, a styrene-butadiene rubber, a chloroprene rubber or a butadiene rubber, natural rubber, a styrene type thermoplastic elastomer such as a styrene-polybutadiene-styrene type synthetic rubber, an olefin type thermoplastic elastomer such as a polyethylene-EPDM synthetic rubber, a urethane type thermoplastic elastomer of caprolactone-type, adipate-type or PTMG-type, a polyester type thermoplastic elastomer such as a polybutylene terephthalate-polytetramethylene glycol multiblock polymer, a polyamide type thermoplastic elastomer such as a nylon-polyol block copolymer or a nylon-polyester block copolymer, a 1,2-polybutadiene type thermoplastic elastomer, or a vinyl chloride type thermoplastic elastomer. These elastomer components may be used alone or in combination as a mixture of two or more of them, if the compatibility is good.

Among them, from the viewpoint of the solubility to the polymerizable vinyl monomer and good thermal shock resistance, at least one member selected from the group consisting of an acrylonitrile-butadiene-methacrylic acid copolymer, an acrylonitrile-butadiene-methyl methacrylate copolymer, a butadiene-styrene-methyl methacrylate copolymer and an acrylonitrile-butadiene rubber, is preferred, and particularly preferred is an acrylonitrile-butadiene-methacrylic acid copolymer.

The acrylonitrile-butadiene-methacrylic acid copolymer is not particularly limited, but one having structural units of the following formulae (D), (E) and (F) is preferred, since the effect is large. As an acrylonitrile-butadiene-methacrylic acid copolymer having structural units of the formulae (D), (E) and (F), Nipol DN612, tradename, manufactured by Nippon Zeon Co., Ltd., may, for example, be mentioned.

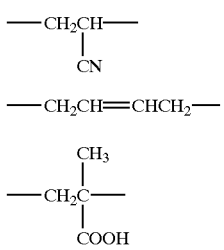

It is further preferred to use the acrylonitrile-butadiene-methacrylic acid copolymer in combination with a butadiene-styrene-methyl methacrylate copolymer to further improve the effects.

The component (5) is used preferably in an amount of from 5 to 40 parts by weight, more preferably from 10 to 35 parts by weight, per 100 parts by weight of the total amount of the components (2) and (5). If it is less than 5 parts by weight, the viscosity, the thermal shock resistance and the adhesion at room temperature tend to be poor, and if it exceeds 40 parts by weight, the viscosity tends to be too high, whereby there will be inconvenience from the viewpoint of the operation, or the thermal shock resistance or the adhesion at room temperature tends to be poor.

Further, in the present invention, it is preferred to use (6) the acid phosphate compound of the following formula (C) in order to improve the curing-accelerating effect, the adhesive strength under the thermal shock resistance and the adhesion at room temperature.

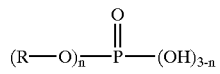

wherein R is $CH_2=CR_4CO(OR_5)_m-$ (wherein $R_4$ is hydrogen or a methyl group, $R_5$ is $-C_2H_4-$, $-C_3H_6-$, $-CH_2CH(CH_3)-$, $-C_4H_8-$, $-C_6H_{12}-$ or

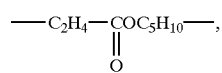

and m is an integer of from 1 to 10), and n is an integer of 1 or 2.

This acid phosphate compound of the formula (C) may, for example, be acid phosphoxyethyl acrylate, acid phosphoxyethyl methacrylate, acid phosphoxypropyl acrylate, acid phosphoxypropyl methacrylate, bis(2-acryloyloxyethyl) phosphate or bis(2-methacryloyloxyethyl) phosphate. These compounds may be used alone or in combination of two or more of them. Among them, (2-hydroxyethyl)methacryl acid phosphate is preferred from the viewpoint of the bond strength and good adhesion after the thermal shock test of the field system of a speaker.

(6) The acid phosphate compound of the formula (C) is used preferably in an amount of from 0.05 to 20 parts by weight, more preferably from 0.05 to 10 parts by weight, most preferably from 0.5 to 5 parts by weight, per 100 parts by weight of the total amount of the components (2) and (5). If it is less than 0.05 part by weight, the effect of the addition tends to be poor, and if it exceeds 20 parts by weight, the thermal shock resistance and the adhesion at room temperature tend to be poor.

Further, in the present invention, acrylic acid or methacrylic acid may be used to improve the adhesion to a metal. If acrylic acid or methacrylic acid is used in a large amount, it is likely that rust forms on a metal. Accordingly, acrylic acid or methacrylic acid is used preferably in an amount of from 0 to 5 parts by weight, more preferably from 0 to 3 parts by weight, per 100 parts by weight of the total amount of the components (2) and (5). If it exceeds 5 parts by weight, it is likely that rust will form on a metal.

Further, to facilitate curing of a portion which is in contact with air, various paraffins may be incorporated to the curable resin composition of the present invention. Such paraffins include, for example, paraffin, microcrystalline wax, carnauba wax, bee wax, lanoline, whale wax, ceresin and candelilla wax.

The amount of such paraffins is preferably from 0.1 to 5 parts by weight, per 100 parts by weight of the total amount of the components (2) and (5). If the amount is less than 0.1 part by weight, the effects of addition tend to be poor, and if it exceeds 5 parts by weight, the bond strength tends to be low.

Further, for the purpose of improving storage stability, various antioxidants including a polymerization inhibitor, may be used. The antioxidants include, for example, hydroquinone, hydroquinone monomethyl ether, 2,6-di-tert-butyl-p-cresol, 2,2'-methylenebis(4-methyl-6-tert-butylphenol), triphenylphosphite, phenothiazine and N-isopropyl-N'-phenyl-p-phenylenediamine.

The polymerization inhibitor is used preferably in an amount of from 0.001 to 3 parts by weight, per 100 parts by weight of the total amount of the components (2) and (5). If it is less than 0.001 part by weight, the effects of addition tend to be poor, and if it exceeds 3 parts by weight, the bond strength tends to be poor.

Further, for the purpose of adjusting the viscosity or fluidity, a polymer such as chlorosulfonated polyethylene, polyurethane, a styrene-acrylonitrile copolymer or polymethyl methacrylate, or fine powdery silica, may also be used.

In addition, known additives such as a filler, a colorant and a rust-preventing agent may also be incorporated, as the case requires.

As a practical embodiment of the curable resin composition of the present invention, it is preferred to use the resin composition as an adhesive composition. In such a case, it is preferably used as a two-pack type adhesive composition, since it is excellent in the storage stability.

In the case of the two-pack type adhesive composition, not all of the essential components of the adhesive composition of the present invention are mixed for storage. Namely, the adhesive composition is divided into a first pack and a second pack, and at least (3) the organic peroxide is incorporated in the first pack, and at least (4) the reducing agent is incorporated in the second pack, and they are preferably separately stored. Components other than the components (3) and (4) may be incorporated in either one or both of the first and second packs, and the first pack may contain the component (3) only, or the second pack may contain the component (4) only. However, the component (6) is preferably incorporated in the second pack from the viewpoint of the storage stability.

Preferred among two-pack type adhesive compositions is one wherein the components (1), (2), (3) and (5) are incorporated in the first pack, and the components (1), (2), (4), (5) and (6) are incorporated in the second pack, from the viewpoint of the operation efficiency and easiness in production.

In the case of the two-pack type adhesive composition, the two packs may simultaneously or separately coated for contact and curing and thereby used as a two-pack type adhesive composition.

As another practical embodiment, the polymerizable vinyl monomer and other optional components may preliminarily be incorporated in either one or both of the first and second pack, and the two are mixed at the time of curing and thus used as a one-pack type adhesive composition.

In the present invention, adherends will be bonded by a cured product of the adhesive composition to obtain a composite. The adherends may be made of various materials such as magnet, paper, wood, ceramics, glass, porcelain, rubber, plastics, mortar, concrete and metals without any particular limitation. However, it is preferred to use the composition for bonding ceramics-ceramics, ceramics-metal and/or metal-metal, from the viewpoint of high thermal shock resistance, and it is more preferred to use the composition for bonding ceramics-metal. Among ceramics, a magnet is preferred.

As an application of the present invention, it is preferred to use the composition for a speaker from the viewpoint of high thermal shock resistance, and it is more preferred to use the composition for bonding the peripheral portion of a frame and the peripheral portion of a cone of a speaker, and/or, for bonding in a case where the adherends are the field system of a speaker, i.e. for bonding a bottom plate and/or a top plate with a magnet. Most preferably, it is used for bonding the bottom plate and/or the top plate with the magnet.

PREFERRED EMBODIMENTS OF THE INVENTION

Now, the present invention will be described in further detail with reference to Examples. However, it should be understood that the present invention is by no means restricted to such specific Examples. In the following Examples, the amounts of various materials are shown by parts by weight.

Used as an acrylonitrile-butadiene-methacrylic acid copolymer is one manufactured by Nippon Zeon Co., Ltd. (tradename: Nipol DN612)

Various physical properties were measured as follows.
Curing Time

In accordance with JIS K-6850, in an environment with a humidity of 50% at a temperature of 23° C., first and second packs of an adhesive composition were mixed by a static mixer and coated on one side of a test specimen (SPCC-D sand blast treated steel plate of 100 mm×25 mm×1.6 mm), and another test specimen was overlaid and bonded thereto, whereupon the bonded specimens were used as a sample for measuring the curing time.

As the curing time (unit: minutes) of the sample, the time was measured from immediately after coating in an environment with a humidity of 50% at a temperature of 23° C. until the push pull gauge (Model S, manufactured by Komura K.K.) showed at least 0.39 (MPa/3.125 cm$^2$).

Thermal Shock Strength of a Speaker Field System

Figure 2:
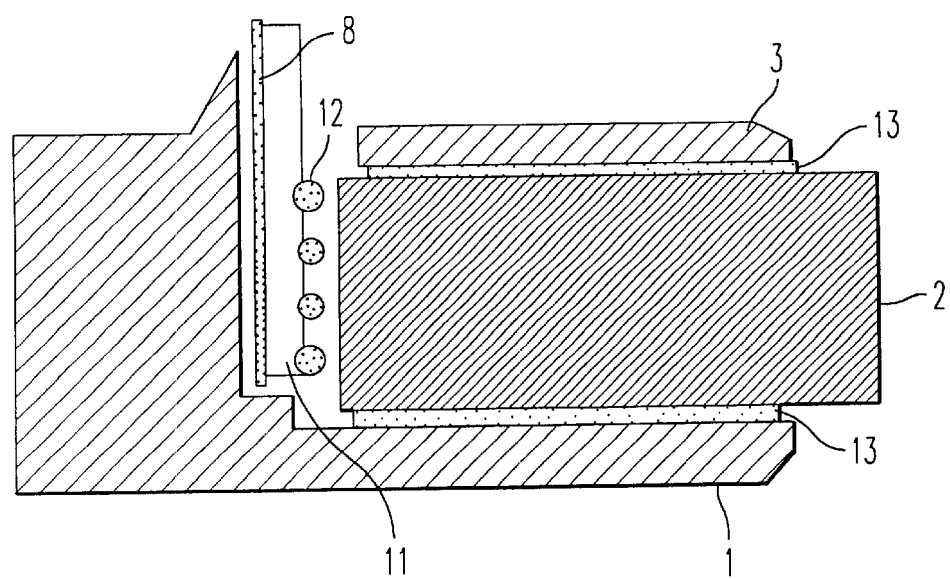
FIG. 2 is a cross-sectional view showing the structure of a field system of the speaker.

A speaker field system as shown in FIG. 2 was assembled in an environment with a humidity of 50% at 23° C. As the material for a bottom plate 1 and a top plate 3, iron having its surface treated with chromate plating, was used. As the material for a magnet 2, ferrite magnet was used.

As the bonding method, 0.25 g of an adhesive prepared by mixing equal amounts of the first and second packs by a static mixer in an atmosphere with a humidity of 50% at a temperature of 23° C., was coated on the bottom plate 1 shown in FIG. 2, followed by bonding to one side of magnet 2. Five minutes later, about 0.25 g of the adhesive likewise mixed, was coated on the other side of the magnet 2, followed by bonding to the top plate 3 and aged at room temperature for 24 hours. Then, using a thermal shock tester (THERMAL SHOCK CHAMBER Model TSR-63W, manufactured by Tabaiespec Company), the speaker field system was subjected to 240 cycle exposure, wherein each cycle includes the test conditions represented by the formula (a).

Test Conditions for One Cycle

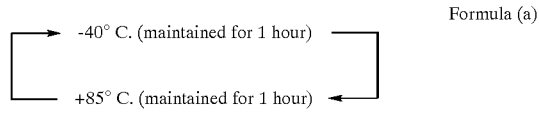

Formula (a)

Figure 3:
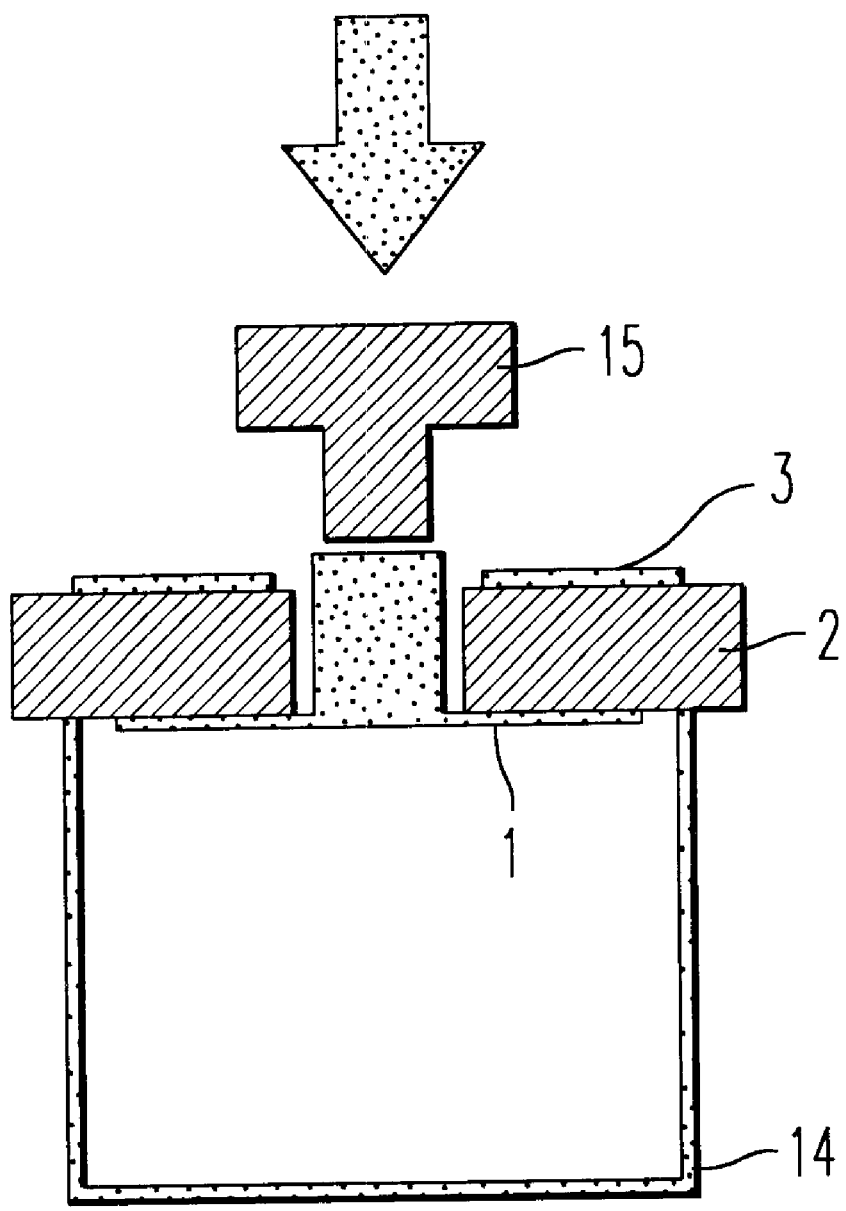
FIG. 3 is a cross-sectional view showing the method for measuring the thermal shock strength of the field system of the speaker.

After the exposure by the thermal shock test, the thermal shock strength (unit: kgf) of the speaker field system was measured by the method illustrated in FIG. 3, by calculating the compression tensile strength of the magnet 2 and the bottom plate 1 of the speaker field system in an environment with a humidity of 50% at 23° C. The peripheral portion of the magnet 2 was placed on the peripheral portion of a fixing jig 14, and a bottom plate compression jig 15 was inserted at the center of the bottom plate 1. The bottom plate compression jig 15 was pushed in the direction of the arrow at a compression speed of 1 mm/min, whereby the thermal shock strength of the speaker field system was measured.

Thermal Shock Test Adhesion of a Speaker Field System

The thermal shock test adhesion was evaluated as follows from the state of failure of the test specimen after measuring the thermal shock strength of the speaker field system. Usually, high bond strength is obtainable when cohesive failure takes place. Accordingly, with respect to the state of failure, cohesive failure is preferred.

⊙: Cohesive failure
○: Cohesive failure and interfacial failure are present in a mixed state, but portions of cohesive failure are substantial.
X: Interfacial failure Magnet Thermal Shock Test The magnet thermal shock test was evaluated as follows from the state of the magnet after measuring the thermal shock strength of the speaker field system.

⊙: The magnet is not broken, and no fine cracks are observed. Further, even if a force is manually exerted, the magnet will not peel from the bottom plate or the top plate.
○: Fine cracks are observed in the magnet, but the magnet is not broken.
X: The magnet is broken. Further, the magnet peels from the bottom plate or the top plate.

Adhesion

The adhesion was evaluated as follows from the state of failure by a shear test using a test specimen in accordance with JIS K-6850 (SPCC-D sand blast treated steel plate of 100 mm×25 mm×1.6 mm). With respect to the shear test specimen, an adhesive composition prepared by mixing the first and second packs of the adhesive composition by a static mixer, was coated on one side of the test specimen, and immediately thereafter, another test specimen was overlaid and bonded thereto, followed by aging for 24 hours, whereupon the adhesion was measured at a tensile speed of 10 mm/mm in an environment with a humidity of 50% at a temperature of 23° C. Usually, high bond strength is obtainable when cohesive failure takes place. Accordingly, with respect to the state of failure, cohesive failure is preferred.

⊙: Cohesive failure
○: Cohesive failure and interfacial failure are present in a mixed state, but portions of cohesive failure are substantial.
X: Interfacial failure Storage Stability 20 g of the first pack of the curable resin composition was charged into a glass test tube and left to stand in warm water of 70° C., whereby the time until gelation was ascertained. The evaluation was carried as follows.

○: Stable for at least 4 hours.
X: Gelled in less than 4 hours.

Corrosiveness to Copper 5 g of the second pack of the curable resin composition was put into a 200 cc bottle and a copper plate was suspended therein. A cover was put on the bottle, and the bottle was left to stand for one week in an atmosphere of 25° C., whereupon whether or not rust had formed on the copper plate, was visually inspected. The evaluation was carried out as follows.

○: No rust formed.
X: Rust formed.

TEST EXAMPLE 1

The respective materials were mixed in the amounts as identified in Table 1 to prepare adhesive compositions comprising first and second packs. The results of measurements are also shown in Table 1.

TABLE 1

| Test No. | 1-1 | 1-2 | 1-3 | 1-4 | 1-5 | 1-6 | 1-7 | 1-8 | 1-9 |
|---|---|---|---|---|---|---|---|---|---|
| Amount (unit: parts by weight) | | | | | | | | | |
| 1st pack | | | | | | | | | |
| Component (1) | | | | | | | | | |
| Di-2-ethylhexyl adipate | 0 | 1.0 | 3.0 | 9.0 | 18.0 | 35.0 | 40.0 | 9.0 | 100.0 |
| Component (2) | | | | | | | | | |
| Methyl methacrylate | 29.0 | 29.0 | 29.0 | 29.0 | 29.0 | 29.0 | 29.0 | 29.0 | |
| 2-Hydroxyethyl methacrylate | 41.5 | 41.5 | 41.5 | 41.5 | 41.5 | 41.5 | 41.5 | 41.5 | |
| 2-Ethylhexyl methacrylate | 12.5 | 12.5 | 12.5 | 12.5 | 12.5 | 12.5 | 12.5 | | |
| Epoxy ester 3000 M | | | | | | | | 12.5 | |
| Component (3) | | | | | | | | | |
| Cumene hydroperoxide | 7.0 | 7.0 | 7.0 | 7.0 | 7.0 | 7.0 | 7.0 | 7.0 | 7.0 |
| Component (5) | | | | | | | | | |
| Acrylonitrile-butadiene-methacrylic acid copolymer | 6.8 | 6.8 | 6.8 | 6.8 | 6.8 | 6.8 | 6.8 | 6.8 | |
| Butadiene-styrene-methyl methacrylate copolymer | 10.2 | 10.2 | 10.2 | 10.2 | 10.2 | 10.2 | 10.2 | 10.2 | |
| 2nd pack | | | | | | | | | |
| Component (1) | | | | | | | | | |
| Di-2-ethylhexyl adipate | 0 | 1.0 | 3.0 | 9.0 | 18.0 | 35.0 | 40.0 | 9.0 | 100.0 |
| Component (2) | | | | | | | | | |
| Methyl methacrylate | 29.0 | 29.0 | 29.0 | 29.0 | 29.0 | 29.0 | 29.0 | 29.0 | |
| 2-Hydroxyethyl methacrylate | 41.5 | 41.5 | 41.5 | 41.5 | 41.5 | 41.5 | 41.5 | 41.5 | |
| 2-Ethylhexyl methacrylate | 12.5 | 12.5 | 12.5 | 12.5 | 12.5 | 12.5 | 12.5 | | |
| Epoxy ester 3000 M | | | | | | | | 12.5 | |
| Component (4) | | | | | | | | | |
| Ethylenethiourea | 3.0 | 3.0 | 3.0 | 3.0 | 3.0 | 3.0 | 3.0 | 3.0 | 3.0 |

TABLE 1-continued

| Test No. | 1-1 | 1-2 | 1-3 | 1-4 | 1-5 | 1-6 | 1-7 | 1-8 | 1-9 |
|---|---|---|---|---|---|---|---|---|---|
| Component (5) | | | | | | | | | |
| Acrylonitrile-butadiene-methacrylic acid copolymer | 6.8 | 6.8 | 6.8 | 6.8 | 6.8 | 6.8 | 6.8 | 6.8 | |
| Butadiene-styrene-methyl methacrylate copolymer | 10.2 | 10.2 | 10.2 | 10.2 | 10.2 | 10.2 | 10.2 | 10.2 | |
| Copolymer (6) | | | | | | | | | |
| (2-Hydroxyethyl)methacryl acid phosphate | 1.2 | 1.2 | 1.2 | 1.2 | 1.2 | 1.2 | 1.2 | 1.2 | 1.2 |
| Evaluation | | | | | | | | | |
| Curing time (min) | 4 min 15 sec | 4 min | 3 min 45 sec | 3 min | 3 min 15 sec | 3 min 45 sec | 4 min | 2 min 45 sec | Adhesive not cured |
| Thermal shock strength of the speaker field system (kgf) | Magnet peeled | 60 | 102 | 154 | 123 | 108 | 64 | 48 | |
| Thermal shock test adhesion of the speaker field system | | ○ | ⊚ | ⊚ | ⊚ | ⊚ | ○ | ○ | |
| Thermal shock test of the magnet | | ○ | ⊚ | ⊚ | ⊚ | ⊚ | ○ | ○ | |
| Note | Comparative | Invention | Invention | Invention | Invention | Invention | Invention | Invention | Comparative |

TEST EXAMPLE 2

The respective materials were mixed in the amounts as identified in Tables 2 to 4 to prepare adhesive compositions comprising first and second packs. The results of measurements are also shown in Tables 2 to 4.

TABLE 2

| Test No. | 2-1 | 2-2 | 2-3 |
|---|---|---|---|
| Amount (unit: parts by weight) | | | |
| 1st pack | | | |
| Component (1) | | | |
| Di-2-ethylhexyl adipate | 18.0 | | |
| Di-2-ethylhexyl phthalate | | 18.0 | |
| Diheptyl phthalate | | | 18.0 |
| Component (2) | | | |
| Methyl methacrylate | 33.8 | 33.8 | 33.8 |
| 2-Hydroxyethyl methacrylate | 50.6 | 50.6 | 50.6 |
| Component (3) | | | |
| Cumene hydroperoxide | 6.0 | 6.0 | 6.0 |
| Component (5) | | | |
| Acrylonitrile-butadiene rubber | 6.2 | 6.2 | 6.2 |
| Butadiene-styrene-methyl methacrylate copolymer | 9.4 | 9.4 | 9.4 |
| 2nd pack | | | |
| Component (1) | | | |
| Di-2-ethylhexyl adipate | 18.0 | | |
| Di-2-ethylhexyl phthalate | | 18.0 | |
| Diheptyl phthalate | | | 18.0 |
| Component (2) | | | |
| Methyl methacrylate | 33.8 | 33.8 | 33.8 |
| 2-Hydroxyethyl methacrylate | 50.6 | 50.6 | 50.6 |
| Component (4) | | | |
| Ethylenethiourea | 2.0 | 2.0 | 2.0 |
| Component (5) | | | |
| Acrylonitrile-butadiene rubber | 6.2 | 6.2 | 6.2 |
| Butadiene-styrene-methyl methacrylate copolymer | 9.4 | 9.4 | 9.4 |
| (2-Hydroxyethyl)methacryl acid phosphate | 1.0 | 1.0 | 1.0 |
| Other | | | |
| Methacrylic acid | 3.0 | 3.0 | 3.0 |
| Evaluation | | | |
| Curing time (min) | 2 min 15 sec | 2 min 30 sec | 2 min 30 sec |

TABLE 3

| Test No. | 2-4 | 2-5 | 2-6 |
|---|---|---|---|
| Amount (unit: parts by weight) | | | |
| 1st pack | | | |
| Component (1) | | | |
| Diisodecyl phthalate | 18.0 | | |
| Diisononyl phthalate | | 18.0 | |
| Di-n-octyl phthalate | | | 18.0 |
| Component (2) | | | |
| Methyl methacrylate | 33.8 | 33.8 | 33.8 |
| 2-Hydroxyethyl methacrylate | 50.6 | 50.6 | 50.6 |
| Component (3) | | | |
| Cumene hydroperoxide | 6.0 | 6.0 | 6.0 |
| Component (5) | | | |
| Acrylonitrile-butadiene rubber | 6.2 | 6.2 | 6.2 |
| Butadiene-styrene-methyl methacrylate copolymer | 9.4 | 9.4 | 9.4 |
| 2nd pack | | | |
| Component (1) | | | |
| Diisodecyl phthalate | 18.0 | | |

TABLE 3-continued

| Test No. | 2-4 | 2-5 | 2-6 |
|---|---|---|---|
| Diisononyl phthalate | | 18.0 | |
| Di-n-octyl phthalate | | | 18.0 |
| Component (2) | | | |
| Methyl methacrylate | 33.8 | 33.8 | 33.8 |
| 2-Hydroxyethyl methacrylate | 50.6 | 50.6 | 50.6 |
| Component (4) | | | |
| Ethylenethiourea | 2.0 | 2.0 | 2.0 |
| Component (5) | | | |
| Acrylonitrile-butadiene rubber | 6.2 | 6.2 | 6.2 |
| Butadiene-styrene-methyl methacrylate copolymer | 9.4 | 9.4 | 9.4 |
| Copolymer (6) | | | |
| (2-Hydroxyethyl)methacryl acid phosphate | 1.0 | 1.0 | 1.0 |
| Other | | | |
| Methacrylic acid | 3.0 | 3.0 | 3.0 |
| Evaluation | | | |
| Curing time (min) | 2 min 30 sec | 2 min 25 sec | 2 min 20 sec |

TABLE 4

| Test No. | 2-7 | 2-8 | 2-9 |
|---|---|---|---|
| Amount (unit: parts by weight) | | | |
| 1st pack | | | |
| Component (1) | | | |
| Di-n-decyl phthalate | 18.0 | | |
| Di-linevol 79 phthalate | | 18.0 | |
| Methylacetyl ricinolate | | | 18.0 |
| Component (2) | | | |
| Methyl methacrylate | 33.8 | 33.8 | 33.8 |
| 2-Hydroxyethyl methacrylate | 50.6 | 50.6 | 50.6 |
| Component (3) | | | |
| Cumene hydroperoxide | 6.0 | 6.0 | 6.0 |
| Component (5) | | | |
| Acrylonitrile-butadiene rubber | 6.2 | 6.2 | 6.2 |
| Butadiene-styrene-methyl methacrylate copolymer | 9.4 | 9.4 | 9.4 |
| 2nd pack | | | |
| Component (1) | | | |
| Di-n-decyl phthalate | 18.0 | | |
| Di-linevol 79 phthalate | | 18.0 | |
| Methylacetyl ricinolate | | | 18.0 |
| Component (2) | | | |
| Methyl methacrylate | 33.8 | 33.8 | 33.8 |
| 2-Hydroxyethyl methacrylate | 50.6 | 50.6 | 50.6 |
| Component (4) | | | |
| Ethylenethiourea | 2.0 | 2.0 | 2.0 |
| Component (5) | | | |
| Acrylonitrile-butadiene rubber | 6.2 | 6.2 | 6.2 |
| Butadiene-styrene-methyl methacrylate copolymer | 9.4 | 9.4 | 9.4 |
| Copolymer (6) | | | |
| (2-Hydroxyethyl)methacryl acid phosphate | 1.0 | 1.0 | 1.0 |
| Other | | | |
| Methacrylic acid | 3.0 | 3.0 | 3.0 |
| Evaluation | | | |
| Curing time (min) | 2 min 30 sec | 2 min 25 sec | 2 min 30 sec |

TEST EXAMPLE 3

The respective materials were mixed in the amounts as identified in Table 5 to prepare adhesive compositions comprising first and second packs. The results of measurements are also shown in Table 5.

TABLE 5

| Test No. | 3-1 | 3-2 | 3-3 | 1-4 | 3-4 | 3-5 | 3-6 | 3-7 | 3-8 |
|---|---|---|---|---|---|---|---|---|---|
| Amount (unit: parts by weight) | | | | | | | | | |
| 1st pack | | | | | | | | | |
| Component (1) | | | | | | | | | |
| Di-2-ethylhexyl adipate | 9.0 | 9.0 | 9.0 | 9.0 | 9.0 | 9.0 | 9.0 | 9.0 | 9.0 |
| Component (2) | | | | | | | | | |
| Methyl methacrylate | 35.0 | 33.25 | 31.5 | 29.0 | 22.75 | 21.0 | 29.0 | 29.0 | |
| 2-Hydroxyethyl methacrylate | 50.0 | 47.50 | 45.0 | 41.5 | 32.50 | 30.0 | 41.5 | 41.5 | |
| 2-Ethylhexyl methacrylate | 15.0 | 14.25 | 13.5 | 12.5 | 9.75 | 9.0 | 12.5 | 12.5 | |
| Component (3) | | | | | | | | | |
| Cumene hydroperoxide | 7.0 | 7.0 | 7.0 | 7.0 | 7.0 | 7.0 | 7.0 | 7.0 | 7.0 |

TABLE 5-continued

| Test No. | 3-1 | 3-2 | 3-3 | 1-4 | 3-4 | 3-5 | 3-6 | 3-7 | 3-8 |
|---|---|---|---|---|---|---|---|---|---|
| Component (5) | | | | | | | | | |
| Acrylonitrile-butadiene-methacrylic acid copolymer | | 2.0 | 4.0 | 6.8 | 14.0 | 16.0 | | | 40.0 |
| Acrylonitrile-butadiene rubber | | | | | | | 6.8 | 6.8 | |
| Butadiene-styrene-methyl methacrylate copolymer | | 3.0 | 6.0 | 10.2 | 21.0 | 24.0 | 10.2 | 10.2 | 60.0 |
| 2nd pack | | | | | | | | | |
| Component (1) | | | | | | | | | |
| Di-2-ethylhexyl adipate | 9.0 | 9.0 | 9.0 | 9.0 | 9.0 | 9.0 | 9.0 | 9.0 | 9.0 |
| Component (2) | | | | | | | | | |
| Methyl methacrylate | 35.0 | 33.25 | 31.5 | 29.0 | 22.75 | 21.0 | 29.0 | 29.0 | |
| 2-Hydroxyethyl methacrylate | 50.0 | 47.50 | 45.0 | 41.5 | 32.50 | 30.0 | 41.5 | 41.5 | |
| 2-Ethylhexyl methacrylate | 15.0 | 14.25 | 13.5 | 12.5 | 9.75 | 9.0 | 12.5 | 12.5 | |
| Component (4) | | | | | | | | | |
| Ethylenethiourea | 3.0 | 3.0 | 3.0 | 3.0 | 3.0 | 3.0 | 3.0 | | 3.0 |
| Vanadylacetyl acetonate | | | | | | | | 0.5 | |
| Component (5) | | | | | | | | | |
| Acrylonitrile-butadiene-methacrylic acid copolymer | | 2.0 | 4.0 | 6.8 | 14.0 | 16.0 | | | 40.0 |
| Acrylonitrile-butadiene rubber | | | | | | | 6.8 | 6.8 | |
| Butadiene-styrene-methyl methacrylate copolymer | | 3.0 | 6.0 | 10.2 | 21.0 | 24.0 | 10.2 | 10.2 | 60.0 |
| Copolymer (6) | | | | | | | | | |
| (2-Hydroxyethyl)methacryl acid phosphate | 1.2 | 1.2 | 1.2 | 1.2 | 1.2 | 1.2 | 1.2 | 1.2 | |
| Evaluation | | | | | | | | | |
| Curing time (min) | 5 min | 3 min | 3 min | 3 min | 3 min 15 sec | 3 min 30 sec | 3 min 30 sec | 4 min | Adhesive not cured |
| Thermal shock strength of the speaker field system (kgf) | 0 | 60 | 120 | 154 | 107 | 63 | 46 | 40 | |
| Thermal shock test adhesion of the speaker field system | X | ○ | ⊙ | ⊙ | ⊙ | ○ | ○ | ○ | |
| Adhesion | X | ○ | ⊙ | ⊙ | ⊙ | ○ | ○ | ○ | |
| Note | Comparative | Invention | Invention | Invention | Invention | Invention | Invention | Invention | Comparative |

TEST EXAMPLE 4

The respective materials were mixed in the amounts as identified in Table 6 to prepare adhesive compositions comprising first and second packs. The results of measurements are also shown in Table 6.

TABLE 6

| Test No. | 4-1 | 4-2 | 4-3 | 1-4 | 4-4 | 4-5 | 4-6 | 1-1 |
|---|---|---|---|---|---|---|---|---|
| Amount (unit: parts by weight) | | | | | | | | |
| 1st pack | | | | | | | | |
| Component (1) | | | | | | | | |
| Di-2-ethylhexyl adipate | 9.0 | 9.0 | 9.0 | 9.0 | 9 0 | 9.0 | 9.0 | 0 |
| Component (2) | | | | | | | | |
| Methyl methacrylate | 29.0 | 29.0 | 29.0 | 29.0 | 29.0 | 29.0 | 29.0 | 29.0 |
| 2-Hydroxyethyl methacrylate | 41.5 | 41.5 | 41.5 | 41.5 | 41.5 | 41.5 | 41.5 | 41.5 |
| 2-Ethylhexyl methacrylate | 12.5 | 12.5 | 12.5 | 12.5 | 12.5 | 12.5 | 12.5 | 12.5 |
| Component (3) | | | | | | | | |
| Cumene hydroperoxide | 7.0 | 7.0 | 7.0 | 7.0 | 7.0 | 7.0 | 7.0 | 7.0 |
| Component (5) | | | | | | | | |
| Acrylonitrile-butadiene- | 6.8 | 6.8 | 6.8 | 6.8 | 6.8 | 6.8 | 6.8 | 6.8 |

TABLE 6-continued

| Test No. | 4-1 | 4-2 | 4-3 | 1-4 | 4-4 | 4-5 | 4-6 | 1-1 |
|---|---|---|---|---|---|---|---|---|
| methacrylic acid copolymer Butadiene-styrene-methyl methacrylate copolymer 2nd pack Component (1) | 10.2 | 10.2 | 10.2 | 10.2 | 10.2 | 10.2 | 10.2 | 10.2 |
| Di-2-ethylhexyl adipate Component (2) | 9.0 | 9.0 | 9.0 | 9.0 | 9.0 | 9.0 | 9.0 | 0 |
| Methyl methacrylate | 29.0 | 29.0 | 29.0 | 29.0 | 29.0 | 29.0 | 29.0 | 29.0 |
| 2-Hydroxyethyl methacrylate | 41.5 | 41.5 | 41.5 | 41.5 | 41.5 | 41.5 | 41.5 | 41.5 |
| 2-Ethylhexyl methacrylate Component (4) | 12.5 | 12.5 | 12.5 | 12.5 | 12.5 | 12.5 | 12.5 | 12.5 |
| Ethylenethiourea Component (5) | 3.0 | 3.0 | 3.0 | 3.0 | 3.0 | 3.0 | 3.0 | 3.0 |
| Acrylonitrile-butadiene-methacrylic acid copolymer | 6.8 | 6.8 | 6.8 | 6.8 | 6.8 | 6.8 | 6.8 | 6.8 |
| Butadiene-styrene-methyl methacrylate copolymer Copolymer (6) | 10.2 | 10.2 | 10.2 | 10.2 | 10.2 | 10.2 | 10.2 | 10.2 |
| (2-Hydroxyethyl)methacryl acid phosphate Evaluation | 0 | 0.05 | 0.5 | 1.2 | 5.0 | 10.0 | 20.0 | 1.2 |
| Curing time (min) | 3 min 30 sec | 3 min 20 sec | 3 min 10 sec | 3 min | 2 min 50 sec | 2 min 40 sec | 2 min 30 sec | 4 min 15 sec |
| Thermal shock strength of the speaker field system (kgf) | 23 | 107 | 141 | 154 | 155 | 121 | 31 | Magnet peeled |
| Thermal shock test adhesion of the speaker field system | X | ○ | ◎ | ◎ | ◎ | ○ | X | |
| Adhesion | X | ○ | ◎ | ◎ | ◎ | ○ | X | X |
| Note | Invention | Invention | Invention | Invention | Invention | Invention | Invention | Comparative |

TEST EXAMPLE 5

The respective materials were mixed in the amounts as identified in Table 7 to prepare adhesive compositions comprising first and second packs. The results of measurements are also shown in Table 7.

However, in Test Nos. 5-1 to 5-3, the component (1) was not used, and the curing time was quickened.

TABLE 7

| Test No. | 1-4 | 5-1 | 5-2 | 5-3 |
|---|---|---|---|---|
| Amount (unit: parts by weight) | | | | |
| 1st pack Component (1) | | | | |
| Di-2-ethylhexyl adipate Component (2) | 9.0 | 0 | 0 | 0 |
| Methyl methacrylate | 29.0 | 29.0 | 29.0 | 29.0 |
| 2-Hydroxyethyl methacrylate | 41.5 | 41.5 | 41.5 | 41.5 |
| 2-Ethylhexyl methacrylate Component (3) | 12.5 | 12.5 | 12.5 | 12.5 |
| Cumene hydroperoxide Component (5) | 7.0 | 7.0 | 15.0 | 7.0 |
| Acrylonitrile-butadiene-methacrylic acid copolymer | 6.8 | 6.8 | 6.8 | 6.8 |
| Butadiene-styrene-methyl methacrylate copolymer 2nd pack Component (1) | 10.2 | 10.2 | 10.2 | 10.2 |
| Di-2-ethylhexyl adipate Component (2) | 9.0 | 0 | 0 | 0 |
| Methyl methacrylate | 29.0 | 29.0 | 29.0 | 29.0 |
| 2-Hydroxyethyl methacrylate | 41.5 | 41.5 | 41.5 | 41.5 |
| 2-Ethylhexyl methacrylate Component (4) | 12.5 | 12.5 | 12.5 | 12.5 |
| Ethylenethiourea Component (5) | 3.0 | 15.0 | 3.0 | 3.0 |
| Acrylonitrile-butadiene-methacrylic acid copolymer | 6.8 | 6.8 | 6.8 | 6.8 |
| Butadiene-styrene-methyl methacrylate copolymer Copolymer (6) | 10.2 | 10.2 | 10.2 | 10.2 |
| (2-Hydroxyethyl)methacryl acid phosphate Other | 1.2 | 1.2 | 1.2 | 1.2 |
| Methacrylic acid Evaluation | 0 | 0 | 0 | 9.0 |
| Curing time (min) | 3 min | 3 min | 3 min | 3 min |
| Adhesion | ◎ | X | ◎ | ◎ |
| Storage stability | ○ | ○ | X | ○ |
| Corrosiveness to copper | ○ | ○ | ○ | X |

TABLE 7-continued

| Test No. | 1-4 | 5-1 | 5-2 | 5-3 |
|---|---|---|---|---|
| Note | Invention | Comparative | Comparative | Comparative |

With the curable resin composition of the present invention, the curing time is short, and the curing is accelerated. Accordingly, when a speaker field system is produced by automation, it is possible to produce the product in a large quantity, and use of jigs can be substantially reduced.

Further, the curable resin composition of the present invention shows excellent thermal shock resistance even in an environment where the environment changes vigorously from a low temperature to a high temperature within a range of e.g. from −40° C. to 85° C., whereby adherends scarcely undergo peeling.

Especially when it is used as an adhesive composition for a field system of a speaker to be mounted on a vehicle in which the environment changes vigorously from a low temperature to a high temperature, it provides high bond strength and excellent adhesion against the vigorous thermal shock, whereby it is possible to obtain an effect such that the field system scarcely breaks. Especially, the bottom plate 1, the magnet 2 and the top plate 3 will not undergo peeling, and the magnet 2 will not break, against the vigorous thermal shock, whereby the speaker is useful for a long period of time. Thus, the industrial usefulness of the adhesive composition of the present invention is significant.

Especially when an acrylonitrile-butadiene-methacrylic acid copolymer is used as (5) the elastomer component, and the acid phosphate compound represented by (6) is used in combination, better thermal shock resistance and adhesion can be obtained.

Further, the composition has good storage stability and will not corrode metal, whereby it is useful for bonding parts or products made of copper.

What is claimed is:

1. A curable resin composition comprising:
   (1) a compound having a structure of formula (A):

$$R_2\text{-OOC-}R_1\text{-COO-}R_2' \tag{A}$$

wherein each of $R_2$ and $R_2'$ is a $C_{1-10}$ alkyl group, and $R_1$ is an o-phenylene group, m-phenylene group, p-phenylene group, or $-(CH_2)_n-$ wherein n is from 4 to 6,
   (2) at least one hydroxy-functional acrylate and/or methacrylate monomer,
   (3) an organic peroxide,
   (4) a reducing agent, and
   (5) an elastomer component comprising at least one polymer selected from the group consisting of an acrylonitrile-butadiene-methacrylic acid copolymer, an acrylonitrile-butadiene-methyl methacrylate copolymer, a butadiene-styrene-methyl methacrylate copolymer, and an acrylonitrile-butadiene rubber,
   wherein component (1) is present in an amount of from 1 to 40 parts by weight per 100 parts by weight of the total amount of components (2) and (5),
   component (2) is present in an amount of from 60 to 95 parts by weight per 100 parts by weight of the total amount of compounds (2) and (5),
   component (3) is present in an amount of from 0.5 to 10 parts by weight per 100 parts by weight of the total amount of components (2) and (5),
   component (4) is present in an amount of from 0.1 to 10 parts by weight per 100 parts by weight of the total amount of component (2) and (5), and
   component (5) is present in an amount of from 5 to 40 parts by weight per 100 parts by weight of the total amount of components (2) and (5).

2. The curable resin composition according to claim 1, further comprising (6) an acid phosphate compound of formula (C):

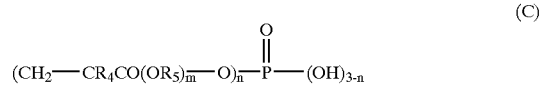

(C)

wherein $R_4$ is hydrogen or a methyl group; $R_5$ is $-C_2H_4-$, $-C_3H_6-$, $-CH_2CH(CH_3)-$, $-C_4H_8-$, $-C_6H_{12}-$ or

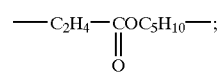

m is an integer of from 1 to 10, and n is an integer of 1 or 2.

3. The curable resin composition according to claim 1, wherein (1) the compound having a structure of the formula (A) is di-2-ethylhexyl adipate and/or di-n-octyl phthalate.

4. The curable resin composition according to claim 1, wherein (2) the polymerizable vinyl monomer is at least one member selected from the group consisting of 2-hydroxyethyl acrylate, and 2-hydroxyethyl methacrylate.

5. The curable resin composition according to claim 1, wherein (5) the elastomer component is an acrylonitrile-butadiene-methacrylic acid copolymer.

6. The curable resin composition according to claim 1, wherein:
   component (1) is present in an amount of from 3 to 35 parts by weight per 100 parts by weight of the total amount of components (2) and (5),
   component (2) is present in an amount of from 65 to 90 parts by weight per 100 parts by weight of the total amount of components (2) and (5),
   component (3) is present in an amount of from 1 to 8 parts by weight per 100 parts by weight of the total amount of components (2) and (5),
   component (4) is present in an amount of from 0.5 to 5 parts by weight per 100 parts by weight of the total amount of component (2) and (5), and
   component (5) is present in an amount of from 10 to 35 parts by weight per 100 parts by weight of the total amount of components (2) and (5).

7. The curable resin composition according to claim 1, wherein the curable resin composition consists essentially of components (1) to (5).

8. The curable resin composition according to claim 1, which is a two-pack type curable resin composition comprising a first pack and a second pack, wherein the first pack contains at least the organic peroxide, and the second pack contains at least the reducing agent.

9. An adhesive composition containing the curable resin composition as defined in claim 1.

10. A cured product of the adhesive composition as defined in claim 9.

11. A composite comprising adherends bonded by the cured product as defined in claim 10.

12. The composite according to claim 11, wherein the adherends each independently comprise a metal or a ceramic.

13. The composite according to claim 11, wherein a ceramic adherend is bonded to a metal adherend.

14. The composite according to claim 12, wherein at least one adherend is a magnet.

15. The composite according to claim 11, wherein the bonded adherends are selected from the group consisting of (1) a frame and a cone of a speaker, which are bonded to each other along their peripheral portions; (2) a bottom plate, a magnet and a top plate of a speaker, which are laminated and bonded to form a field system of the speaker; (3) and combinations thereof.

16. The composite according to claim 15, wherein the adherends are a bottom plate, a magnet and a top plate of a speaker, which are laminated and bonded to form a field system of the speaker.

* * * * *